D. B. LANDERS.
FUNNEL.
APPLICATION FILED MAR. 11, 1913.

1,083,107.

Patented Dec. 30, 1913.

WITNESSES

INVENTOR
David B. Landers
By E. E. Vrooman, his Attorney

UNITED STATES PATENT OFFICE.

DAVID B. LANDERS, OF HOLLYWOOD, CALIFORNIA.

FUNNEL.

1,083,107.   Specification of Letters Patent.   Patented Dec. 30, 1913.

Application filed March 11, 1913.   Serial No. 753,549.

*To all whom it may concern:*

Be it known that I, DAVID B. LANDERS, a citizen of the United States, residing at Hollywood, in the county of Los Angeles and State of California, have invented certain new and useful Improvements in Funnels, of which the following is a specification, reference being had therein to the accompanying drawing.

This invention relates to funnels, and has for its object the production of an efficient means for filtering the liquid before the same passes therefrom.

Another object of this invention is the production of an air passageway for allowing the air to escape from the vessel which is being filled.

With these and other objects in view this invention consists of certain novel combinations, constructions, and arrangements of parts as will be hereinafter fully described and claimed.

Figure 1:
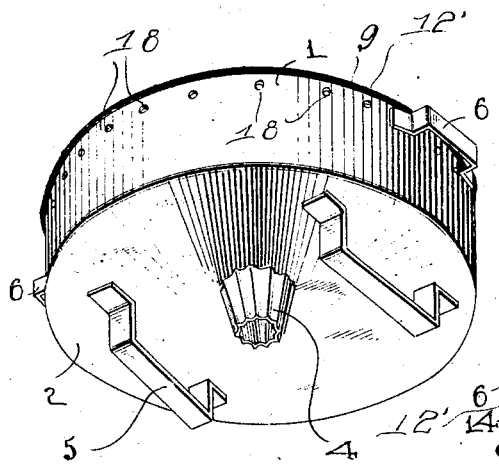
Figure 2:
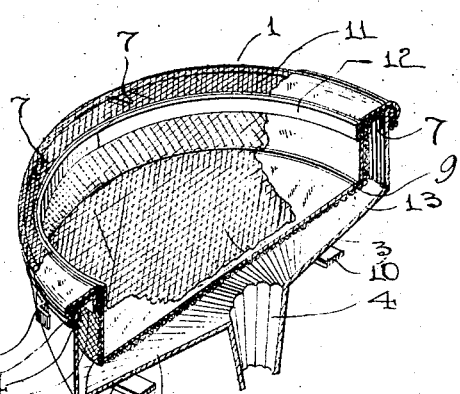
Figure 3:
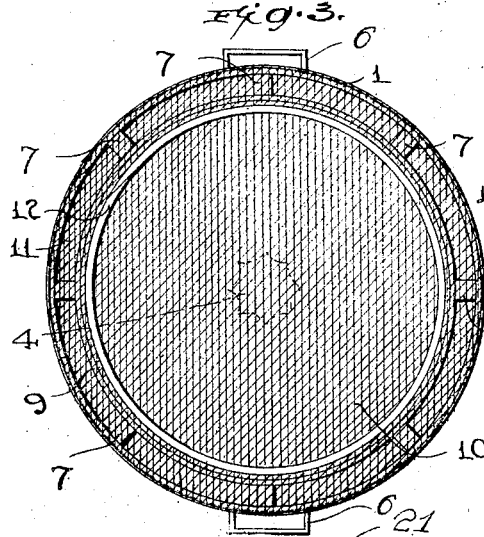
Figure 4:
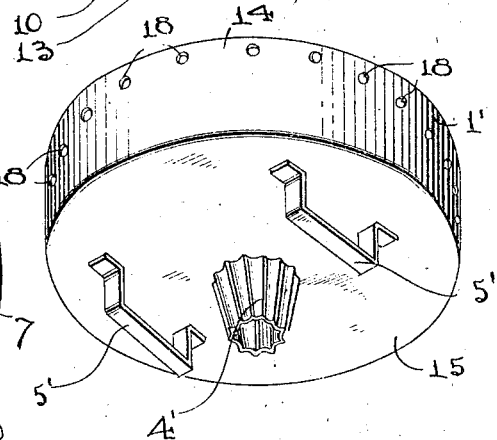
Figures 5, 6:
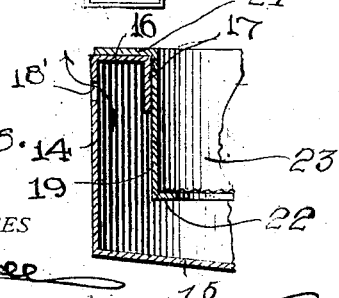

In the accompanying drawing:—Figure 1 is a perspective view of the exterior portion of the funnel. Fig. 2 is a sectional perspective view of the interior of the funnel. Fig. 3 is a top plan view of the device showing the chamois filter removed. Fig. 4 is a perspective view of the exterior portion of the funnel showing a slightly modified form thereof. Fig. 5 is a vertical sectional view of a portion of the funnel taken through one of the bracket members. Fig. 6 is a vertical sectional view of a portion of the funnel as illustrated in the modified form.

Referring to the accompanying drawing by numerals it will be seen that the device consists of the sides 1 which carry the bottom 2 which is concaved so as to allow the liquid to flow toward the central portion. This bottom 2 is provided with the centrally arranged opening 3 adjacent which is formed the nozzle or spout 4. In order to allow the funnel to be placed upon a flat surface or to be supported upon the member which is being filled the bottom is also provided with the substantially U-shape supports 5 for this purpose. The sides 1 are also provided with the ordinary handles 6 for carrying the funnel when it is so desired.

The sides 1 carry upon the inner sides thereof and adjacent the top portion a plurality of brackets 7 which are provided with the depending portions 8. These brackets 7 carry the wire filter basket 10. The basket is spaced from the side portions of the funnel by means of the brackets 7 as illustrated in Figs. 2 and 5 and the lower portion is also spaced from the bottom 2. Within this basket filter there is a chamois filter member 9 which constitutes a filter for the liquid for removing the dirt or sediment therefrom.

The wire basket 10 constitutes a supporting means for the chamois filter for relieving the chamois from the weight of the dirt.

The sides 1 of the funnel are provided with the beaded portion 1'. The wire basket 10 and the chamois filter 9 are bent back over the brackets 7 as indicated at 11 to form a filtering closure for the space between the basket 10 and the sides 1. In order to hold the basket and chamois in their correct position there is provided a metal band 12 which is adapted to fit upon the inner portions of the filter 9 so as to bear upon the depending portions 8 of the brackets 7 and in this manner hold the basket 10 and the filter 9 in the correct position. In order to hold the filter 9 and basket 10 over the brackets the filter and basket extend over the beaded portion 1' and also to relieve the strain from the band 12 there is provided a retaining ring 12' which rests upon the filter and wire basket and bears against the bead 1'.

When a vessel is being filled the nozzle or spout 4 is placed therein at which time the liquid is poured into the funnel. The air which is contained in the vessel is allowed to escape by passing up through the spout 4 and through the air passage 13 which is formed by spacing the wire basket and the skin filter at a distance from the bottom 2. The air then passes up the air passage formed as illustrated at 14 and will be allowed to escape through the openings 18 formed in the sides 1, and in this manner the vessel may be filled without causing the liquid contained within the funnel to bubble or splash over the side portions thereof.

In the modified form illustrated in Figs. 4 and 6 the sides 14 are provided with the usual bottom 15 and the spout 4' and supports 5'. The sides 14 extend up and are bent over to form a closing rim 16 which terminates in the depending flange 17. This depending flange is adapted to hold the supporting member 19 which comprises the sides 20 and supporting flanges 21 and 22. The flange 21 rests upon the rim 16 for supporting the member 19 at a spaced distance from the bottom 15 while the flange 22 supports the filtering screen 23. This modified form is of course, provided with the usual air passage 13 for allowing the air to pass from the vessel, which is being filled, and in order to allow the air to escape from this passage the sides 14 are provided with a plurality of apertures 18' for this purpose. By use of this rim 16 any dirt or foreign object will be prevented from falling down into the air passage, and in this manner down through the spout 4' into the vessel which is being filled.

Having thus described the invention what is claimed as new, is:—

A funnel of the class described comprising a body having straight sides and concaved bottom, inverted U-shaped spacing brackets fixedly secured to said sides, a wire filter basket positioned within said body, a skin filter positioned within said wire basket, the upper portions of said brackets extending evenly with the upper portion of said sides, said sides provided with a plurality of openings adjacent the upper portion thereof, the upper portions of said wire filter basket and said skin filter folded back over said brackets so as to rest evenly upon the upper portions of said brackets, a ring positioned upon the outer portion of said body for holding said wire filter basket and said skin filter upon said brackets, a retaining band positioned within said body for holding said filters upon said brackets, said filters positioned at an equally spaced distance from said sides and bottom by means of said brackets for allowing the free passage of air therearound, said skin filter fitting over said brackets for preventing dirt from entering between said sides and said filters.

In testimony whereof I hereunto affix my signature in presence of two witnesses.

DAVID B. LANDERS.

Witnesses:
RALPH C. LONG,
ARTHUR W. LARSON.